No. 663,795. Patented Dec. 11, 1900.
J. F. STEVENS.
DOUGH MIXER.
(Application filed Mar. 30, 1900.)
(No Model.)
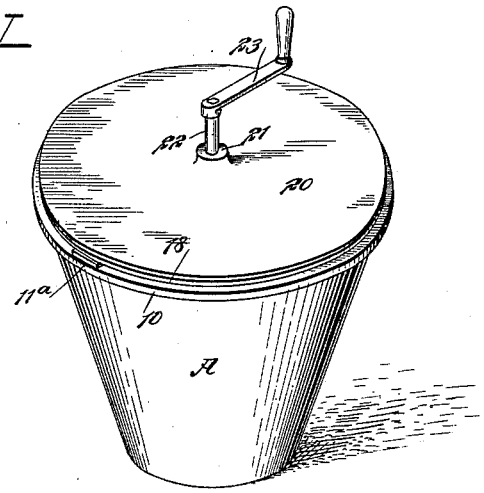
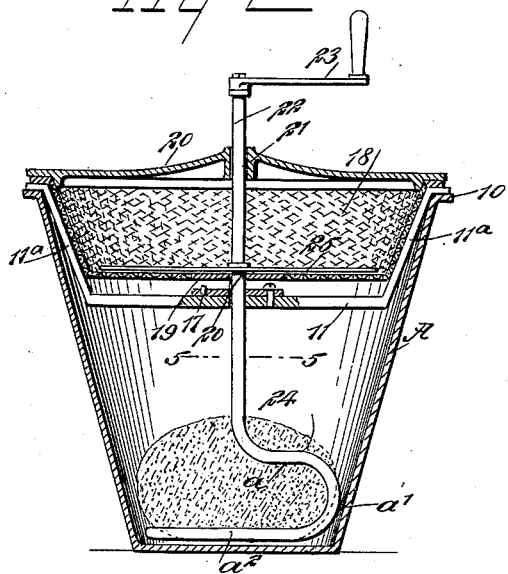
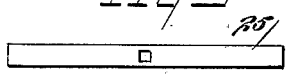
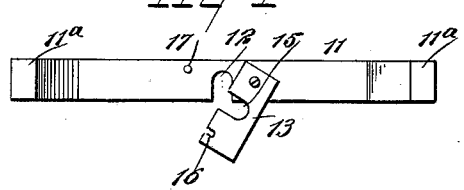
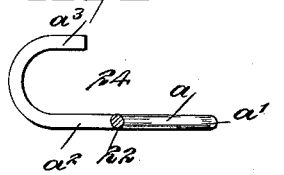
WITNESSES:
INVENTOR
James F. Stevens
BY
ATTORNEYS
THE NORRIS PETERS CO., PHOTO-LITHO., WASHINGTON, D. C.

UNITED STATES PATENT OFFICE.

JAMES FRANCIS STEVENS, OF PORT CHESTER, NEW YORK.

DOUGH-MIXER.

SPECIFICATION forming part of Letters Patent No. 663,795, dated December 11, 1900.

Application filed March 30, 1900. Serial No. 10,811. (No model.)

*To all whom it may concern:*

Be it known that I, JAMES FRANCIS STEVENS, a citizen of the United States, and a resident of Port Chester, in the county of Westchester and State of New York, have invented certain new and useful Improvements in Dough-Mixers, of which the following is a full, clear, and exact description.

One purpose of the invention is to so construct a mixer for dough that the dough may be quickly and effectually kneeded and finally converted into a practically round mass, which mass after the dough has been fermented or risen may be lifted by the mixing agent from the receptacle in which it is mixed and transferred to another pan or to a molding-board without leaving any particles of dough behind in the vessel or on the mixer.

A further purpose of the invention is to provide a sifter for flour so constructed that the flour may be sifted in the bottom of the main receptacle in a manner to form a central depression in which water may be placed; or the flour may be sifted and the dough mixed at the same time, and as the flour leaves the sieve much more rapidly than the dough is mixed the flour will be kept between the mixing-dough and the sides of the pan.

It is also another purpose of the invention to construct a device of the character described which will not only be simple and easily operated but will prove durable and practically self-cleaning.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved device. Fig. 2 is a vertical section through the same. Fig. 3 is a detail plan view of the agitator, which is located in the sieve. Fig. 4 is a detail plan view of the guide-bar for the shaft of the mixer, and Fig. 5 is a horizontal section on the line 5 5 of Fig. 2.

A represents a vessel which may be of any desired shape, but is preferably made with downwardly-tapering sides and with an upper outwardly-extending marginal flange 10. A guide-bar 11 is located within the vessel A at a convenient point between the top and the bottom, and this guide-bar is provided with arms $11^a$ at its ends, which arms extend upward and have their upper ends carried outward, so as to rest upon the marginal flange 10 of the vessel A, and thus support the guide-bar 11. This guide-bar is provided at its center with a slot 12, made preferably in one of its longitudinal edges, as shown in Fig. 3, and a latch 13 in the form of a plate is pivoted to the upper surface of the body portion of the guide-bar 11. This latch has a recess 15 produced in one of its longitudinal edges, adapted when the latch is carried over the guide-bar to register with the recess 12 therein. A smaller recess 16 is made in the same longitudinal edge of the latch-plate, said recess when the latch is closed upon the guide-bar receiving a pin 17, secured to said bar and which constitutes a keeper for the latch; but any suitable locking device can be placed on the shaft and the guide-bar be provided with a simple hole through its center.

A sieve 18 is fitted in the upper portion of the vessel A, above the body portion of the guide-bar 11, and is provided with a marginal flange which rests upon the supporting-flanges for the guide-bar 11. The sieve is provided with a solid portion 19 at the center of its bottom, and an opening 20 is made in this solid section 19, registering with the recess 12 in the guide-bar 11.

A cover 20 of suitable construction is fitted to the upper portion of the vessel A, and at the central portion of this cover a sleeve 21 is located, which extends through the said cover, and the sleeve 21 receives and guides the upper end of a shaft 22, at the outer extremity of which a crank 23 is secured. This shaft passes down through the opening 20 in the solid portion of the sieve and through the opening in the guide-bar 11, formed by the recesses 12 and 15 in said bar and in the latch-plate, a shoulder or other device being placed on the shaft to prevent the mixer from touching the bottom of the vessel, and this shoulder may bear upon any portion through which the shaft passes—for instance, a cross-arm 25, to be referred to hereinafter. Thus it will be observed that the shaft 22 is not only guided vertically, but is held from undue lateral motion.

The mixer 24 is formed at the lower end of the shaft 22. This mixer consists of an upper member $a$, which is virtually at right angles to the shaft, a downwardly-curved member $a'$, a lower horizontal straight member $a^2$, which is below the upper member $a$, and a preferably horizontal curved extremity $a^3$, forming the lower terminal of the mixer, as is best shown in Fig. 5. The mixer is preferably of such diameter as not to permit the dough to touch the sides of the vessel, being usually somewhat less than half the diameter of the bottom of the pan, so that it closely approaches the sides of the vessel A at the bottom, but does not engage with said surfaces, and the bottom portion of the mixer, while not engaging with the bottom of the vessel A, lies quite close thereto.

In operation water is either first placed in the vessel, and then the flour is sifted therein and the dough mixed at the same time; or the flour is first sifted and the water is then placed upon the flour, the sifter being taken out and the guide-bar substituted. In sifting the flour an agitating-arm 25 is employed, secured to the shaft 22 within the sieve 18 and quite close to its bottom and directly beneath the shoulder on the shaft. Thus it will be observed that by a few turns of the shaft 22 the flour will be fed out through the sieve in close proximity to the side walls of the vessel A, and therefore a practically central space will be provided, into which the water may be poured when it is desired to put water in last. By continuing to revolve the shaft 22 the mixer 24 will in a short time thoroughly commingle the elements, as the flour will be taken up from all points in the vessel and thoroughly mixed with the water. The continued revolution of the shaft 22 will knead or work the mass of dough to such a consistency that it will gradually cleave from the bottom of the vessel and all loose flour from the sides of the vessel will be incorporated in the mass. This result can also be substantially accomplished through the medium of a shaft having a hook-shaped terminal at an angle to its body, the shaft being caused to move up and down by the action of a screw-thread while revolving. When the mass has been sufficiently treated, it will assume substantially a round shape and will be supported by the mixer, and when the mixer is removed the kneaded dough will be carried with it and may thus be conveniently deposited in a pan or upon a molding-board. As the mixer can be drawn through the hole in the guide-bar, it is at such time left free from dough.

All parts of the device are readily accessible and may be thoroughly cleaned; but in practice it will be found that there will be very little material in the vessel, if any, after the mass kneaded therein is removed.

Having thus described my invention, I claim as new and desire to secure by Letters Patent—

1. In a dough-mixer, a mixer-shaft mounted to turn about a vertical axis and provided at its lower end with a curved mixing portion disposed in a horizontal plane.

2. In a dough-mixer, a vessel, a shaft mounted to revolve in the said vessel and provided with a mixing-section, comprising upper and lower portions, a connecting portion and a lower terminal portion removed from the vertical plane of the upper and lower portions, as specified.

3. In a dough-mixer, a vessel, a shaft mounted to revolve therein, a guide-bar removably supported in the vessel, in which the said shaft is removably mounted, said shaft terminating in a mixer at its lower end, which mixer consists of an upper member, a lower vertically-alining member, a connecting member and a terminal member as described, the dimensions of the mixer being such that in operation it does not engage with the inner wall of the receptacle.

4. In a dough-mixer, the combination with a vessel, a guide-bar located within the said vessel and removably supported from the upper portion of the vessel, the guide-bar being provided with an opening and with means for closing the same, a sieve located in the upper portion of the vessel, having a central portion of its bottom surface plain, a shaft passed through the central portion of the bottom of the sieve and the opening in the guide-bar, a mixing device located at the lower end of the shaft, and means for revolving said shaft, connected with the upper portion thereof, as specified.

In testimony whereof I have signed my name to this specification in the presence of two subscribing witnesses.

JAMES FRANCIS STEVENS.

Witnesses:
  FRED D. AUSTIN,
  HARRY PARKER.